(12) United States Patent
Roquemore, III et al.

(10) Patent No.: US 8,567,680 B2
(45) Date of Patent: Oct. 29, 2013

(54) METHOD, DEVICE AND SYSTEM FOR A LASER BAR CODE SCANNER WITH IMAGING ASSIST

(75) Inventors: John P. Roquemore, III, Lawrenceville, GA (US); John E. Wilson, Suwanee, GA (US); Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 11/960,938

(22) Filed: Dec. 20, 2007

(65) Prior Publication Data
US 2009/0159683 A1   Jun. 25, 2009

(51) Int. Cl.
*G06K 7/10*   (2006.01)

(52) U.S. Cl.
USPC .............. 235/462.07; 235/462.01; 235/462.1; 235/462.33

(58) Field of Classification Search
USPC ................. 235/462.1, 462.33, 462.01, 462.07
See application file for complete search history.

(56) References Cited

U.S. PATENT DOCUMENTS

| | | | |
|---|---|---|---|
| 5,763,684 A * | 6/1998 | Kawai et al. | 568/682 |
| 5,763,864 A * | 6/1998 | O'Hagan et al. | 235/462.07 |
| 6,223,988 B1 | 5/2001 | Batterman et al. | |
| 7,121,470 B2 * | 10/2006 | McCall et al. | 235/472.01 |
| 7,137,555 B2 * | 11/2006 | Bremer et al. | 235/462.07 |
| 2001/0027995 A1 | 10/2001 | Patel et al. | |
| 2002/0117547 A1 | 8/2002 | Krichever | |
| 2007/0001014 A1 | 1/2007 | Bremer et al. | |

FOREIGN PATENT DOCUMENTS

| EP | 0 856 812 A2 | 8/1998 |
|---|---|---|
| WO | WO 03/017153 A1 | 2/2003 |

* cited by examiner

*Primary Examiner* — Michael G Lee
*Assistant Examiner* — Tabitha Chedekel
(74) *Attorney, Agent, or Firm* — Harden E. Stevens, III

(57) ABSTRACT

An apparatus, method and system to read a bar code or other optical code using a laser device and an image capture device. Using both devices improves the probability that a bar code is read on the first pass while still allowing a high pass by speed. In addition, using both devices improves the probability of reading a damaged or partially obscured bar code.

23 Claims, 3 Drawing Sheets

METHOD, DEVICE AND SYSTEM FOR A LASER BAR CODE SCANNER WITH IMAGING ASSIST

TECHNICAL FIELD

An apparatus, method and system described herein relates generally to improvements to optical code scanners. More particularly, the invention relates to improving the optical code scanner's ability to read optical codes such as bar codes using both laser and imaging components.

BACKGROUND

Optical code scanners are used in a wide variety of applications that rely on optical codes such as bar codes to store information. Industries such as retail, airline, self service, automotive, parcel delivery, pharmaceutical, healthcare and others use optical codes to provide inventory control, customer identification, product identification, item tracking and many others functions. Optical or bar code scanners are designed to scan an optical code that is typically attached to or printed onto an object. A common example of an optical code is a one dimensional (1D) linear bar code. A 1D bar code is comprised of a number of bars separated by spaces. Information is encoded on the bar code by varying the width of the bars and spaces. This is known as horizontal encoding. When the bar code is placed within the field of view of an optical code scanner, the scanner will detect and analyze the bars and spaces comprising the bar code and then decode the information encoded in the bar code. This operation is also called scanning or reading a bar code. Information encoded on a 1D bar code usually takes the form of ten to twenty alphanumeric numbers. Laser based optical scanners can read 1D bar codes very quickly and thus allows high pass-by speeds for the bar code.

Conventional 1D bar codes are not the only types of bar codes in use. Two dimensional or 2D bar codes are sometimes used when relatively large amounts of information must be encoded into a bar code. A 2D bar code encodes information in both the horizontal and vertical directions and can encode hundreds of characters into a bar code that uses a relatively small area.

Applications that require high pass-by scanning rates use lasers to read the bar codes. Unfortunately, optical code scanners based on lasers are best adapted to read 1D bar codes. 2D bar codes are difficult or in some cases impossible to read with a laser based optical code scanner. Therefore, what is needed is a way to maintain the high pass-by scanning rates for 1D bar codes while also being able to read 2D and other types of bar codes not read by a laser scanner.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
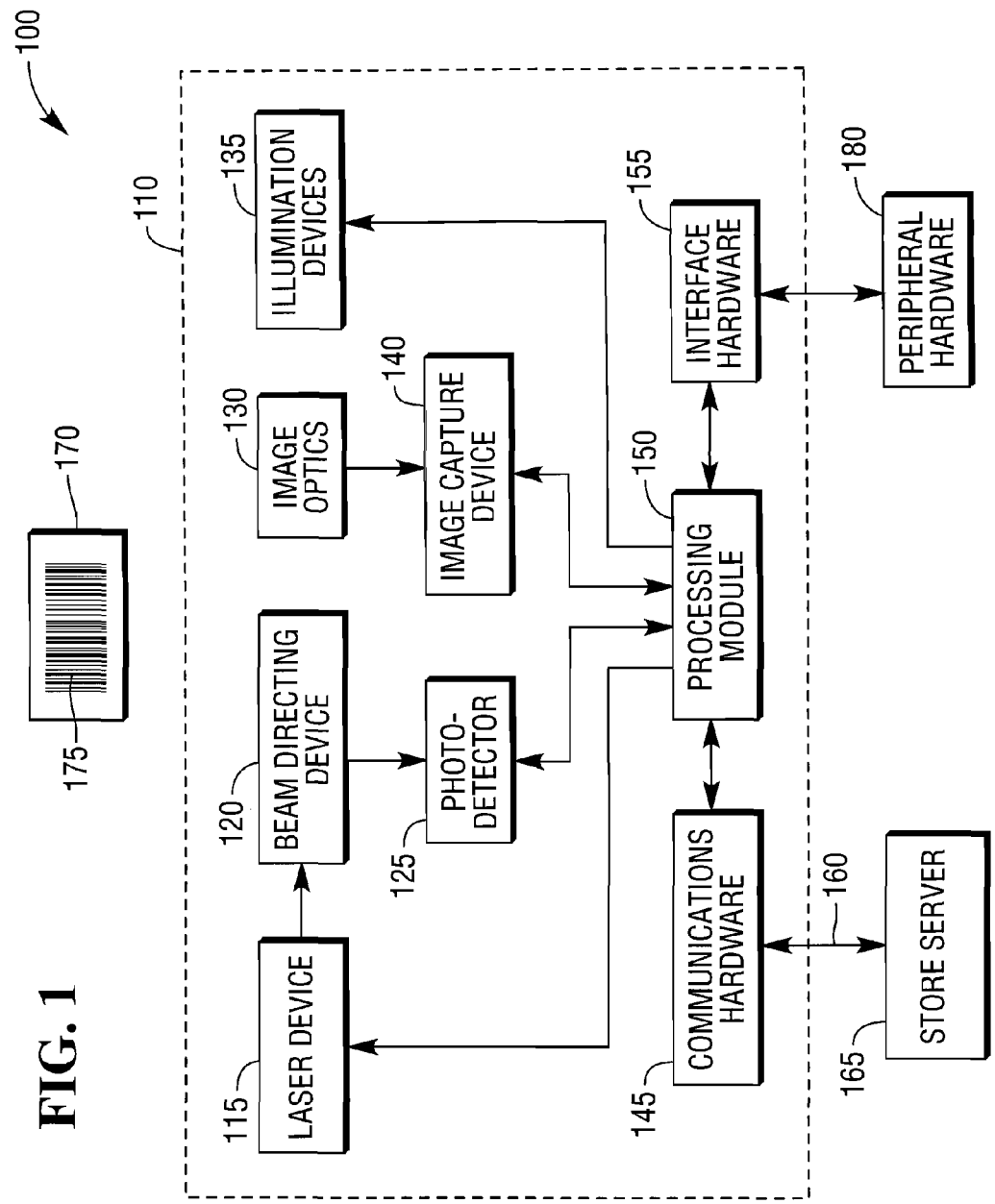
FIG. 1 is a block diagram illustration of an embodiment of an optical scanning system.

Referring now to FIG. 1, there is provided a high level illustration, in block form, of an embodiment of an optical scanning system 100 where the optical scanning system 100 is scanning an optical code 175 which is printed on a label 170. In this embodiment, the optical code 175 is a one dimensional (1D) linear bar code but the optical code 175 can also be a two dimensional (2D) bar code. The optical scanning system 100 comprises an optical scanner 110, a store server 165 connected to the optical scanner 100 over a data network 160 and peripheral hardware 180, some of which is used to communicate and interface with a user. The optical scanner 110 communicates with the store server 165 over a data network 160. The data network 160 can be a wired network (e.g., an Ethernet network) or wireless network (e.g., an IEEE 802.11A/B/G or cellular based network) or a combination of these networks. The data network 160 can be any type of network able to carry the data traffic between the optical scanner 110 and the store server 165. In some embodiments, the store server 165 is physically removed from the store where the optical scanner 110 is located and communicates with the optical scanner 110 over the Internet or a wide area network or a combination of these or different types of networks. In some embodiments, multiple optical scanners 110 communicate over the data network 160 to the store server 165.

The optical scanner 110 comprises a laser device 115 capable of producing a continuous laser beam, a beam directing device 120 for directing and sweeping the laser beam through a region of space adjacent to the optical scanner 110, and a photo-detector 125 for detecting laser light reflected from objects that are placed in the path of the laser beam. In this embodiment, the beam directing device 120 comprises a rotating mirrored spinner and pattern mirrors. The rotating spinner causes the laser beam to sweep through an area of space adjacent to the optical scanner 110 and the photo-detector 125 detects any laser light that is reflected from objects that are in the path of the laser beam. The rotating spinner also has a rotation position sensor for detecting the position of the spinner at it rotates. The optical scanner 110 also comprises one or more illumination devices 135, image optics 130, an image capture device 140, a processing module 150, communications hardware 145 and interface hardware 155. The one or more illumination devices 135 produce and direct light to illuminate the bar code 175. The image optics 130 direct and focus light reflected from the bar code 175 to the image capture device 140, which captures an image of the bar code 175 when instructed to by the processing modules 150. The communications hardware 145 implements an interface to the data network 160 which allows the optical scanner 110 to communicate over the data network 160. The interface hardware 155 provides an interface between the processing module 150 and one or more peripherals 180. The peripheral hardware 180 includes peripherals that communicated with a user such as a display, keyboard, speaker and card reader. In addition to user interface peripherals, the peripheral hardware 180 can include other peripherals such as a currency dispenser, printer, memory sticks (or other types of portable memory devices) and an RFID reader.

The processing module 150 controls or implements the operations of the optical scanner 110. The processing module 150 comprises one or more processors, memory, stored instructions and hardware to control and interface with the other devices and modules that are part of the optical scanner 110. The one or more processors execute the stored instructions to control the hardware and implement the features and functions of the optical scanner 110. This includes the features and functions associated with the laser and imaging components. The processing module 150 uses the data network 160 or a portable memory device to download new or updated instructions or to download configuration information.

The processing module 150 controls the laser device 115, the one or more illumination devices 135 and the rotation of the spinner (not shown but part of the beam directing device 120). These devices are turned on or off independently as determined by the processing module 150. When the optical scanner 110 is in a power saving mode, the laser device 115, the illumination devices 135 and the power to rotate the spinner are turned off to save power. The timing and duration of each action is configurable. For example, since the turn-on time for the laser device 115 and illumination devices 135 is very short, these devices can be powered down after a relatively short period of inactivity by the optical scanner 110. The spinner however, takes a relatively long time to spin up so a longer period of inactivity by the optical scanner 110 is usually required before the spinner is powered down.

The processing module 150 also communicates with the spinner's rotation sensor to determine the position of the spinner at any time. Knowing the position of the spinner and the geometry of the optical scanner 110 including the location and orientation of the laser device 115 and pattern mirrors, the processing module 150 will calculate the location of the laser beam produced by the laser device 115 as it sweeps through the space adjacent to the optical scanner 110 and encounters the bar code 175. Thus, when the photo-detector 125 receives laser light reflected from the bar code 175, the processing module 150, by processing information from the photo-detector 125 about the reflected laser light, will detect the presence of the bar code 175, decode the information encoded in the bar code 175 and if necessary use information from the sensor to determine the general location of the bar code in relation to the optical scanner 110 at that moment in time.

Figure 2:
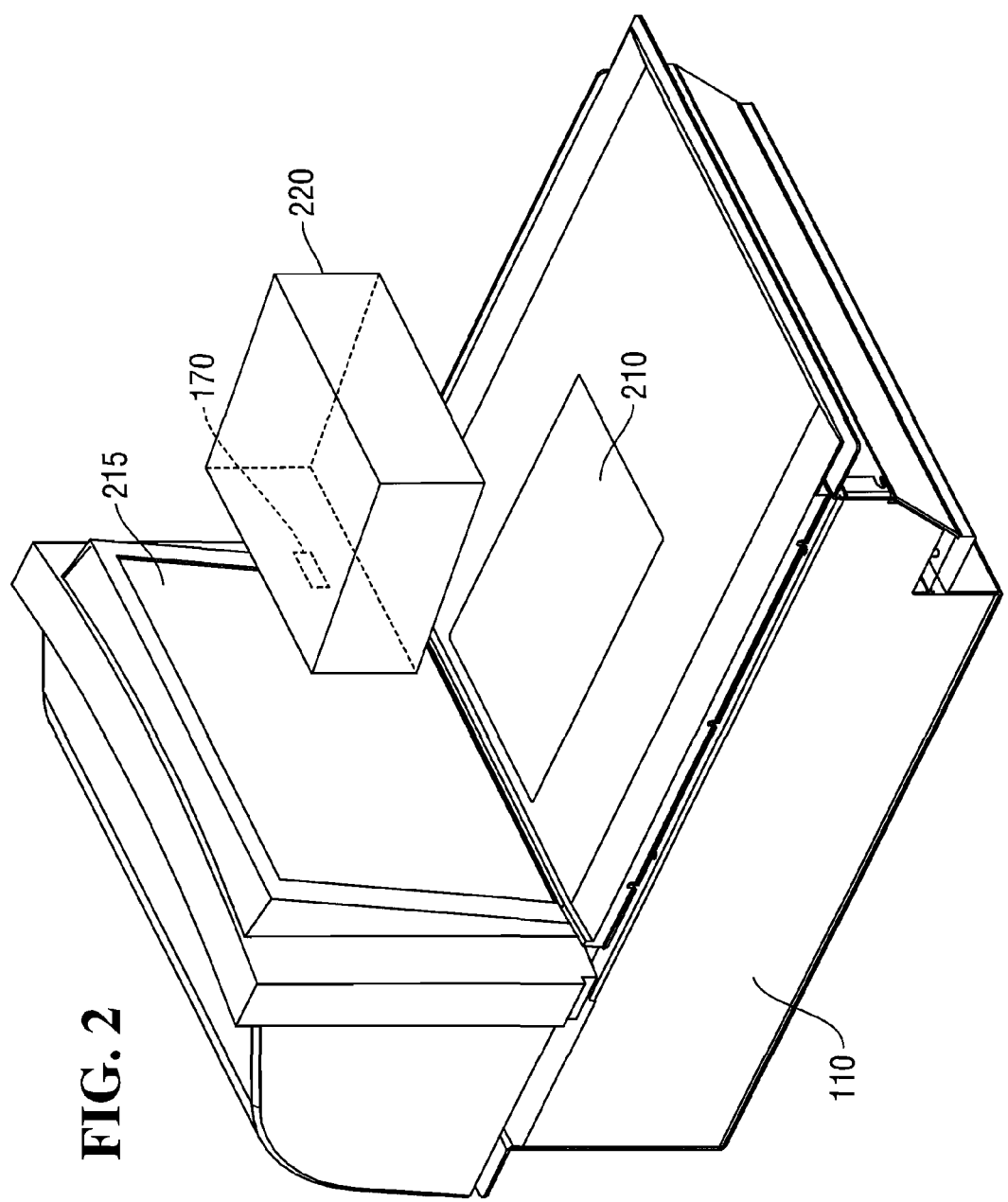
FIG. 2 is an illustration of one embodiment of an optical scanner.

FIG. 2 is an illustration of one embodiment of the optical scanner 110. The optical scanner 110 comprises a horizontal scanning window 210 and vertical scanning window 215. The beam directing device 120 directs the laser beam through these two windows to scan bar code 175 printed on label 170 which is attached to a side of a box 220. The image optics 130 also use the two windows to capture images of the bar code 175. In FIG. 2, the bar code label 170 is oriented toward the vertical scanning window 215 and the bar code 175 is printed on the side of the label 170 away from view. In some embodiments, the optical scanner 110 uses more than one laser device 115 and produces multiple laser beams for scanning. In some embodiments, multiple image capture devices 140 are used to capture images of different areas adjacent to the optical scanner 110.

In addition to decoding bar code information using reflected laser light detected by the photo-detector 125, the processing module 150 also decodes bar code information using images captured by the image capture device 140. The image capture device 140 captures an electronic image of whatever is focused onto it by the image optics 130. The image optics 130 are designed to focus an image taken from an area generally above the horizontal scanning window 210 and focus it on the image capture device 140 using the vertical scanning window 215. In other embodiments, the image optics 130 are designed to use the horizontal scanning window 210 to focus an image generally in front of the vertical scanning window 215 onto the image capture device 140. In still other embodiments, the image optics 130 can focus images onto the image capture device 140 using both the horizontal and vertical scanning windows. In still other embodiments, the optical scanner 110 has multiple image capture devices 140 and multiple image optics 130 to focus an image on each image capture device 140. After the image capture device 140 captures the image, data representing the image is transferred to the processing module 150. The processing module 150 then processes the image data to determine the presences of a bar code and to decode information encoded in the bar code.

The optical scanner 110 continuously scans the area adjacent to the optical scanner for a bar code using the laser. Using the laser gives the optical scanner 110 the ability to read bar codes moving at a high rate of speed past the optical scanner 110. In some cases, the bar code or other optical code is of a type that cannot be read by a laser. A 2D bar code is an example of a bar code that cannot, in most cases, be read by a laser. There are also some 1D bar codes that because of their small size cannot reliably be read by a laser. In some cases, the bar code type is readable by a laser but the bar code has been partially damaged or it is obscured making it impossible to read with a laser. In these cases, it is possible to read the bar code or other optical code by capturing an image of the optical code and then processing the image to decode the information.

Processing image data to decode bar code information requires a significant portion of the processing module's 150 resources. Reducing the amount of image data that must be processed to decode a bar code reduces the load on the processing module's 150 resources. (Lowering the demands on the processing module 150 allows for lower cost components to be used.) If the image data can be divided into at least two portions and it can be determined that a bar code is present in one portion of the image data, then only that portion of the image data is required to be processed. When the processing module 150 determines by means of laser scanning that a bar code is present however, further processing fails to decode the bar code, the processing module 150 then determines the location of the bar code using the position information from the beam directing device 120. The processing module 150 turns off the laser device 115, turns on the one or more illumination devices 135 (if they were off) and captures an image with the image capture device 140. Having determined the general location of the bar code using the laser, the processing module 150 processes only the portion of the image data that has been determined to contain an image of the bar code 175. Processing less than all of the image data reduces the time and the processing module 150 resources needed to decode the information in the bar code 175. In other embodiments that have multiple image capture devices 140, the location information is used to determine which image capture device 140 has the best view of the bar code and that image capture device 140 is used to capture an image. This prevents having to process multiple images to find the image containing the bar code 175.

In some embodiments, the image optics 130 have the additional capability of focusing an image of an object placed against or near one of the scanning windows onto the image capture device 140. The image capture device 140 captures the image and the processing module 150 takes the image from the image capture device 140 and sends it to the store server 165. The store server 165 can store the image for future reference and/or send the image to another terminal for review. In the case where an item is scanned and the product is determined to have an age restriction. The person making the purchase would be required to show an identification (ID) to prove their age. The ID would then be placed in a predetermined location on or near one of the scanning windows and an image of the ID would be captured. The image would then be sent to the store server 165 for storage. The image could also be sent to a supervisor terminal where store personal would authorize or deny the purchase.

Figure 3:
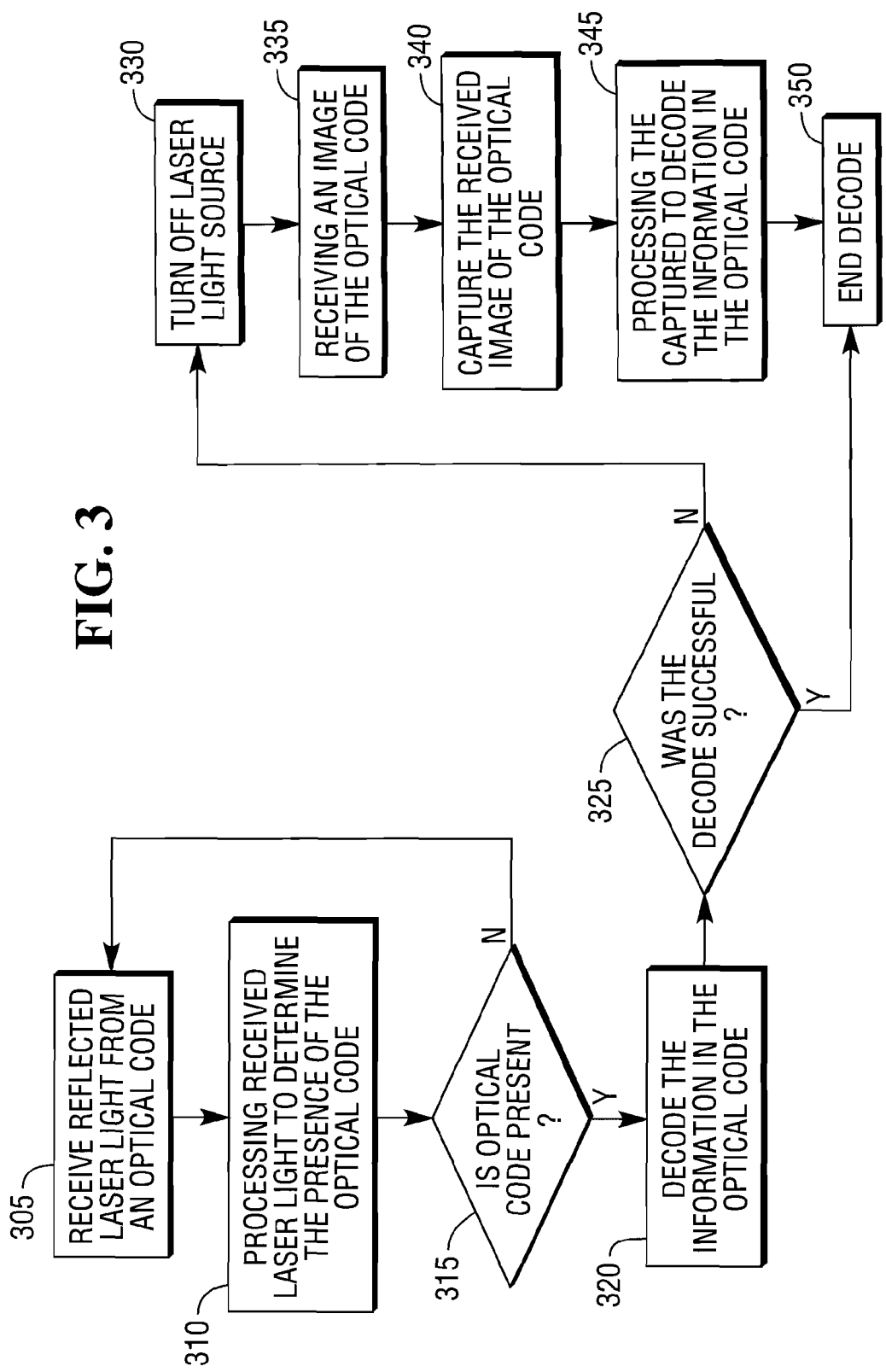
FIG. 3 is a high level flow diagram of one embodiment of the present invention.

Turning now to FIG. 3, there is presented a high level flow diagram for a function of one embodiment of the present invention in which an optical code is detected and decoded. A laser beam produced by a laser device 115 is directed across the optical code by a beam directing device 120. The photodetector 125 receives laser light that is reflected off the optical code 305. The processing module 150 processes the received laser light to determine if an optical code has been scanned by the laser beam 310. If an optical code is not detected, the optical scanner 110 continues to receive reflected laser light. If an optical code is detected, the processing module 150 attempts to process the received laser light to decode the information stored in the optical code 320. (In some embodiments, the detection and decoding of an optical code occur in the same step. The possible results of the step are: 1) no optical code was present, 2) an optical code was present and it was successfully decoded, or 3) an optical was present but it could not be decoded.) If the information is successfully decoded, the read process terminates 350. In some embodiments, the decoded information is then transmitted to the store server 165 for further processing. In some embodiments, the decoded information is further processed by the processing module 150 and information is displayed to a user on peripheral hardware 180.

In some embodiments, the laser beam directing device 120 has a sensor that detects the present location of components used to direct the laser beam. The processing module 150 reads the present position data from the sensor and by using this data along with other known geometric data related to the optical path of the laser beam, calculates the location of the laser beam, at that moment, as the laser beam scans through the space adjacent to the optical scanner 110. Using this information, the processing module 150 can determine the general location of the optical code.

When the attempt to decode the optical code using the reflected laser light fails, the processing module 150 turns off the laser device 115 to prevent the generation of a laser beam 330. In some embodiments, the laser device 115 remains on, however, the processing module 150 causes the beam directing device 120 to direct the laser beam to a location away from the optical code. In some cases, the beam is directed to a location that is inside the optical scanner 110. The optical scanner 110 then receives an image of the optical code 335. The image of the optical code is focused on the image capture device 140 by the image optics 130. In some embodiments, illumination devices 135 are used to provide additional lighting to the optical code. In some embodiments, only ambient light is used to illuminate the optical code when the processing module 150 determines that the available ambient light is sufficiently bright. When the illumination devices 135 are used, the processing module 150 turns the devices 135 on when it turns off the laser device 115. The image capture device 140 captures the image of the optical code that is focused on it by the image optics 130. The processing module 150 processes the captured image to decode the information stored in the optical code. The process of decoding the optical code then terminates 350.

The decoded information from the optical code is sent to the store server 165 using the data network 160. The store server 165 performs additional processing and stores the information.

In some embodiments, the processing module 150 processes less than all of the captured image to decode the optical code. The processing module 150 uses the location of the optical code determined by calculating the location of the laser beam when it moved across the optical code to establish a subset of the captured image, which contains the optical code. Processing only the subset of the captured image reduces the processing time needed to decode the optical code.

In some embodiments, the optical code of FIG. 3 is one dimensional bar code. However, a portion of the bar code has been damaged or obscured making it difficult or impossible for the optical scanner 110 to read the bar code using the laser. In other embodiments, the printed quality of the bar code may be poor. This could be the result of improper ink, low ink in the printer or the result of moment during the printing process. In still other embodiments, the bar code could be based on the Reduced Space Symbology (RSS) standard which cannot be easily be read by a high pass-by laser scanner. In all these embodiments, the optical scanner 110 is able to decode the bar code by capturing and processing an image of the bar code.

In other embodiments, the optical code of FIG. 3 is two dimensional (2D) bar code. In most cases, the optical scanner 110 is able to detect the presence of a bar code with the laser but is not able to decode the 2D bar code using the laser. The optical scanner 110 is able to decode the bar code by capturing an image of the 2D bar code and processing the image.

In some embodiments, the image scanner 110 is designed to read additional types of optical codes other than just bar codes. These optical codes include text, numbers and symbols.

While the invention is disclosed in the context of an image bar code scanning embodiment, it will be recognized that a wide variety of implementations may be employed by a person of ordinary skill in the art consistent with the above discussion and the claims, which follow below.

What is claimed is:

1. A computer implemented method for use in an optical code scanner to read an optical code, the method comprising:
    receiving reflected laser light from the optical code where the reflected laser light results from laser light produced by a laser source and directed across the optical code using a rotating mirrored spinner;
    processing the received laser light by a processing module in the optical code scanner to determine the presence of the optical code and the location of the optical code relative to the optical code scanner;
    further processing the received laser light by the processing module to decode the optical code if the optical code is determined to be present; and
    determining that the optical code cannot be decoded using the received laser light and further implementing steps comprising:
        identifying which one of a plurality of image capture devices has the best view of the optical code using the determined location of the optical code relative to the optical code scanner;
        receiving an image containing the optical code;
        capturing the received image containing the optical code using the identified image capture device having the best view of the optical code to produce captured image data; and
        utilizing the location of the optical code to process a reduced amount of the captured image data by the processing module to decode information from the optical code.

2. The method of claim 1, wherein utilizing the location of the optical code to process a reduced amount of the captured image data to decode information from the optical code is accomplished by using the location of the optical code to determine a portion of the captured image data that contains the optical code and then processing only that portion of the captured image data.

3. The method of claim 1, where the optical code is a bar code.

4. The method of claim 3, where the bar code is a two dimensional (2D) bar code.

5. The method of claim 1, further comprising turning off the laser light source and turning on an illumination source to illuminate the optical code.

6. The method of claim 1, further comprising determining that the optical code can be decoded using the received laser light and decoding the information in the optical code therefrom.

7. The method of claim 1, further comprising determining that the decoded information requires a form of identification and capturing an image of the identification using the image capture device.

8. An apparatus for scanning an optical code, the apparatus comprising:
  a laser device for generating a laser beam;
  a rotating mirrored spinner where the rotating mirrored spinner directs the laser beam across the optical code;
  a photo-detector device where the photo-detector device detects reflected laser light received from the optical code and generates data about the reflected laser light;
  a plurality of image capture devices for capturing an image of the optical code and producing captured image data; and
  a processing module adapted to:
    determine the location of the optical code when the processing module determines that the optical code is present;
    decode the information in the optical code using the data received from the photo-detector when the processing module determines the optical code is present;
    determine the optical code cannot be decoded using the data received from the photo-detector and utilize the location of the optical code to select one of the plurality of image capture devices that has the best view of the optical code;
    receive captured image data from the selected image capture device; and
    utilize the location of the optical code to decode the information in the optical code using a reduced amount of the captured image data.

9. The apparatus of claim 8, where the rotating mirrored spinner is further adapted to provide position data as it directs the laser beam to the optical code.

10. The apparatus of claim 9, where the processing module is further adapted to receive the position data from the rotating mirrored spinner and to determine the location of the optical code using the position data.

11. The apparatus of claim 10, where the decoding the information in the optical code using the captured image data is accomplished by using the location of the optical code to determine a portion of the captured image that contains the optical code and then processing only that portion of the captured image data to decode the information in the optical code.

12. The apparatus of claim 8, where the optical code is a bar code.

13. The apparatus of claim 12, where the bar code is a two dimensional (2D) bar code.

14. The apparatus of claim 8, further comprising an illumination source to illuminate the optical code.

15. The apparatus of claim 14, where the processing module is further adapted to turn the laser device on and the illumination source off when the photo-detector is used to detect the optical code and to turn the laser device off and the illumination source on when the image capture device used to capture the image of the optical code.

16. An optical code scanning system comprising:
  a store server computer;
  a network connected to the store server computer; and
  an optical code scanner connected to the network, the optical code scanner comprising:
    a laser device for generating a laser beam;
    a rotating mirrored spinner adapted to direct the laser beam across an optical code;
    a photo-detector device adapted to detect reflected laser light from the optical code;
    a plurality of image capture device for capturing an image of the optical code and produce captured image data; and
    a processing module adapted to:
      detect the presence and determine the location of the optical code relative to the optical code scanner;
      decode the information in the optical code using data received from the photo-detector when the processing module determines the optical code is present;
      determine the optical code cannot be decoded using the data received from the photo-detector and utilize the location of the optical code to select from the plurality of image capture devices the image capture device that has the best view of the optical code;
      receive captured image data from the selected image capture device:
      utilize the location of the optical code to decode the information in the optical code using a reduced amount of the captured image data of the optical code when the processing module determines the optical code is present but is unable to decode the information in the optical code using data received from the photo-detector; and
      send the decoded information for the optical code to the store server over the network.

17. The apparatus of claim 16, where the rotating mirrored spinner is further adapted to provide position data as it directs the laser beam to the optical code.

18. The apparatus of claim 17, where the processing module is further adapted to receive the position data from the rotating mirrored spinner and to determine a location of the optical code using the position data.

19. The apparatus of claim 18, where the location of the optical code is utilized to determine a portion of the captured image data that contains the optical code and then only that portion of the captured image data is processed to decode the information in the optical code.

20. The apparatus of claim 16, where the optical code is a bar code.

21. The apparatus of claim 20, where the bar code is a two dimensional (2D) bar code.

22. The apparatus of claim 16, further comprising an illumination source to illuminate the optical code.

23. The apparatus of claim 22, where the processing module is further adapted to turn the laser device on and the illumination source off when the photo-detector is used to detect the optical code and to turn the laser device off and the illumination source on when the image capture device is used to capture the image of the optical code.

* * * * *